United States Patent
Scheffel

(10) Patent No.: US 9,585,053 B2
(45) Date of Patent: Feb. 28, 2017

(54) COMMUNICATION NETWORK AND METHOD FOR TRANSMITTING DATA PACKETS IN THE COMMUNICATION NETWORK

(71) Applicant: Siemens Aktiengesellschaft, Munich (DE)

(72) Inventor: Matthias Scheffel, Unterhaching (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 14/408,236

(22) PCT Filed: May 17, 2013

(86) PCT No.: PCT/EP2013/060285
§ 371 (c)(1),
(2) Date: Dec. 15, 2014

(87) PCT Pub. No.: WO2013/189677
PCT Pub. Date: Dec. 27, 2013

(65) Prior Publication Data
US 2015/0124620 A1    May 7, 2015

(30) Foreign Application Priority Data
Jun. 18, 2012 (DE) .................... 10 2012 210 243

(51) Int. Cl.
*H04W 28/02* (2009.01)
*H04L 12/865* (2013.01)
(Continued)

(52) U.S. Cl.
CPC .......... *H04W 28/0278* (2013.01); *H04J 3/06* (2013.01); *H04L 12/4035* (2013.01);
(Continued)

(58) Field of Classification Search
CPC ... H04W 28/0278; H04J 3/06; H04L 47/6255; H04L 12/4035; H04L 12/40156;
(Continued)

(56) References Cited

U.S. PATENT DOCUMENTS 5,497,371 A    3/1996  Ellis et al.
6,091,709 A    7/2000  Harrison et al.
(Continued)

FOREIGN PATENT DOCUMENTS

CN    1585403    2/2005
CN    1905531    1/2007
(Continued)

*Primary Examiner* — Obaidul Huq
(74) *Attorney, Agent, or Firm* — Cozen O'Connor

(57) ABSTRACT

A communications network, computer program product and method for transmitting data packets in the communications network comprising synchronized nodes via a predetermined path in the communications network, wherein the synchronized nodes of the predetermined path include a source node, a target node and at least one intermediate node, the synchronized nodes synchronously feed data packets into the predetermined path and each have first and second buffers for respectively buffering high-priority data packets and low-priority data packets, wherein each intermediate node having an empty first buffer at a given point in time, and to which the source node feeds a high-priority data packet into the predetermined path toward the target node, generates a second high-priority data packet and feeds the generated second high-priority data packet into the predetermined path toward the target node so as to ensure high-priority data packets on the predetermined path are not delayed by low-priority data packets.

20 Claims, 2 Drawing Sheets

(51) Int. Cl.
*H04L 12/863* (2013.01)
*H04L 12/40* (2006.01)
*H04L 12/403* (2006.01)
*H04J 3/06* (2006.01)

(52) U.S. Cl.
CPC .... *H04L 12/40156* (2013.01); *H04L 47/6215* (2013.01); *H04L 47/6255* (2013.01); *H04L 47/6275* (2013.01); *H04L 2012/40221* (2013.01)

(58) Field of Classification Search
CPC ............. H04L 47/6275; H04L 47/6215; H04L 2012/40221
USPC ....... 370/229, 235, 236, 310, 315, 316, 319, 370/321, 324, 345, 350, 351, 352, 355, 370/389, 412, 357, 428, 464, 498, 503, 370/509, 512
See application file for complete search history.

(56) References Cited

U.S. PATENT DOCUMENTS

| | | | |
|---|---|---|---|
| 8,085,784 B2 | 12/2011 | Komagata et al. | |
| 8,767,747 B2 | 7/2014 | Kulkarni et al. | |
| 2004/0114516 A1 | 6/2004 | Iwata et al. | |
| 2007/0053290 A1* | 3/2007 | Michels | H04L 43/16 370/230 |
| 2008/0071924 A1 | 3/2008 | Chilukoor | |
| 2009/0010205 A1* | 1/2009 | Pratt, Jr. | G01D 21/00 370/328 |
| 2009/0307336 A1* | 12/2009 | Hieb | H04L 67/1095 709/220 |
| 2012/0082134 A1* | 4/2012 | Hegde | H04W 36/02 370/331 |

FOREIGN PATENT DOCUMENTS

| | | |
|---|---|---|
| CN | 100391192 | 5/2008 |
| CN | 101534523 | 9/2009 |
| CN | 101599881 | 12/2009 |
| DE | 102008039580 A1 | 3/2010 |
| JP | 1284042 A | 11/1989 |
| WO | WO 2008025620 A1 | 3/2008 |

* cited by examiner

COMMUNICATION NETWORK AND METHOD FOR TRANSMITTING DATA PACKETS IN THE COMMUNICATION NETWORK

REFERENCE TO RELATED APPLICATIONS

This is a U.S. national stage of application No. PCT/EP2013/060285 filed 17 May 2013. Priority is claimed on German Application No. DE102012210243.4 filed 18 Jun. 2012, the content of which is incorporated herein by reference in its entirety.

BACKGROUND OF THE INVENTION

1. Field of the Invention

The present invention relates to a communication network and method for transmitting data packets in the communication network which comprises synchronized nodes via a predetermined path in the communication network.

2. Description of the Related Art

Communication networks for control and regulatory processes, as in the manufacturing and processing industry, are often physically distributed systems in which data need to be transmitted between the participating nodes with a particular quality of service. Examples of such nodes are controllers, sensors, actuators or switches. The communication platform typically used is an industrial Ethernet with realtime capability, such as PROFINET. To ensure short end-to-end delays and little variation therein, particularly jitter, the critical control and regulatory data need to be forwarded with preference, i.e., particularly with priority, over other data in the communication network.

The aforementioned PROFINET communication network as an example of an industrial Ethernet standard is based on a time-division multiplexing method for ensuring different qualities of service. In this case, all the nodes of the PROFINET communication network are synchronized to one another. A time cycle of the time-division multiplexing method used comprises fixed time windows for isochronous realtime traffic (IRT, Isochronous Realtime), other realtime traffic (RT, Realtime) and normal traffic. This cycle is continually repeated. Within the respective time window, exclusively the traffic intended therefor is attended to. Other packets are buffer-stored at the respective node.

The time window for isochronous realtime traffic allows deterministic transfer characteristics, such as for motion control applications. In this context, the network resources along the scheduled path in the communication network are exclusively reserved even before the system is started up. Hence, there is a precise stipulation of when and on what network interface or port a node feeds in a packet or forwards a received packet. This approach allows the prevention of competing access to network resources, such as the simultaneous forwarding of packets via the same port of a node. However, the available resources of the communication network cannot be jointly used by other traffic dynamically and hence efficiently.

In the time window for normal traffic, on the other hand, packets are forwarded based on their priority, particularly via strict priority scheduling, and static multiplexing. Packets are forwarded only when they have been received completely. This can be called store and forward forwarding. However, this can entail high-priority control and regulatory data packets experiencing waiting times at the nodes because the relevant port to which the packets are intended to be forwarded is already blocked by an ongoing transmission process for another packet. This can result in greatly varying end-to-end delays. This problem is shown schematically in FIGS. 1 and 2. In this case, FIG. 1 illustrates a schematic diagram of a network topology for a communication network N with four nodes A, B, C, D. A path P of the communication network N is determined by the subpaths D-C, C-B and B-A. In addition, FIG. 2 shows a schematic diagram for the transmission of data packets P1-P3 via the communication network N of FIG. 1.

The packets P1 and P3 are high-priority data packets, whereas the packet P2 is a low-priority data packet. In this case, by way of example, the node A is a control device (controller) to which high-priority data packets, in this case the data packets P1 and P3, are transmitted cyclically from the sensor nodes B and D. By way of example, the node C is an actuator that receives high-priority manipulated values cyclically from the control device A. Here, the node C sends only low-priority data packets P2 to the node A. Furthermore, it can be assumed that the high-priority data packets P1 and P3 are transmitted as Ethernet packets having the same length. FIG. 2 considers exclusively the communication in the direction of the node A, the destination node. However, a corresponding situation also applies to the opposite direction, in that case to the destination node D.

In detail, FIG. 2 shows the message flow diagram for the transmission of the data packets P1-P3 at the beginning of a cycle at the instant t=0. In this case, t shows the temporal extent, whereas R illustrates the spatial extent. At the instant t=0, the node B sends the high-priority data packet P1 in the direction of the node A, the node C sends the low-priority data packet P2 in the direction of the node A and the node D sends the high-priority data packet P3 in the direction of the node A. Each node B, C, D has only one data packet P1, P2, P3 ready for sending in the direction of the destination node A. As a result, the respective data packet P1, P2, P3 is transmitted at each node B, C, D. The problem is the long transmission period for the low-priority data packet P2 at the node C on account of the high packet length thereof, particularly in comparison with the packet lengths of the high-priority data packets P1, P3.

At the node C, the high-priority data packet P3 arriving from the adjacent node D must wait for the complete transmission of the low-priority data packet P2, since the transmission process for the low-priority data packet P2 had already been started before the packet P3 arrived at the node C. Only after complete transmission of the low-priority data packet P2 with the relatively high data length can the data packet P3 be transmitted from the node C to the node B. At the node B, the data packet P3 must also then await the complete transmission of the data packet P2 from the node B to the node A. The result of this is a long delay for the high-priority data packet P3, particularly for long linear topologies comprising a plurality of nodes.

SUMMARY OF THE INVENTION

It is therefore an object of the present invention to provide improved transmission of data packets in a communication network comprising synchronized data.

This and other objects and advantages are achieved in accordance with the invention by providing a method for transmitting data packets in a communication network comprising synchronized nodes via a predetermined path in the communication network is proposed. In this case, the synchronized nodes of the predetermined path comprise a source node, a destination node and at least one intermediate node. The synchronized nodes feed data packets into the predetermined path in synchronized form and each have a first buffer store for buffer-storing high-priority data packets and a second buffer store for buffer-storing low-priority data packets. The method involves each of the intermediate nodes whose first buffer store is empty at a particular instant at which the source node feeds a first high-priority data packet into the predetermined path in the direction of the destination node generating a second high-priority data packet and feeding the generated second high-priority data packet into the predetermined path in the direction of the destination node.

Hence, the transmission of data packets in the communication network comprising synchronized nodes via a predetermined path is improved in that high-priority data packets on this predetermined path are not delayed by low-priority data packets. To this end, the second high-priority data packets are fed into the predetermined path of the communication network in a specific manner. Here, the additional second high-priority data packets are fed in at the nodes along the predetermined path that send no or fewer high-priority data packets, particularly realtime data, than the other nodes. This minimizes the end-to-end delay and the jitter in the high-priority data packets, particularly in the control and regulatory data. This provides a higher quality of service in the communication network.

A further advantage is that in the respective node it is not necessary to change the scheduling for selecting the next data packet to be sent, particularly based on the strict priority method. Hence, unlike those methods in which all the transmission instants are scheduled, such as in the case of PROFINET IRT (Asynchronous Realtime), the present method is much easier to configure and imposes lower requirements on the hardware of the respective node. Furthermore, the present approach is compatible with other nodes of the communication network that do not support the present expansion given reduced performance.

As already stated above, the additional feeding of short high-priority data packets or packets to all those nodes of the path of the communication network that transmit no or fewer dedicated high-priority data packets than the other nodes of this path is advantageous. This prevents low-priority long data packets from being transmitted at the beginning of the respective time window and high-priority data packets arriving from adjacent nodes being blocked.

By way of example, the communication network is an Ethernet, particularly a PROFINET. The nodes are synchronized, i.e., they all have the same system time. In addition, the synchronized nodes feed the data packets into the predetermined path in sync, i.e., at predetermined identical instants. The source node is the source of the first high-priority data packet, the destination node is the destination of the first high-priority data packet and the at least one intermediate node is coupled in the predetermined path between the source node and the destination node. The respective buffer store is in the form of a RAM store (RAM; Random Access Memory) or in the form of an EEPROM store (Electrical Erasable Programmable Read-Only Memory), for example.

The example below illustrates the operation of the present method. For the communication network of this example, it is assumed that all the control and regulatory data are present at the beginning of the time window and that they can be marked with a higher priority than other data packets, such as via ULAN tagging, and can therefore be treated as high-priority data packets. Furthermore, it is assumed that the high-priority data packets with the control and regulatory data are transmitted in short Ethernet packets having a minimum packet length of 64 bytes or in slightly longer packets. In the case of 100 Mbit/s Ethernet (Fast Ethernet), the transmission period for a short data packet taking account of the preamble (7 bytes), which precedes the packet, and the start-of-frame delimiter (1 byte) is around 6 µs.

By contrast, an Ethernet packet having a maximum length has a transmission period of approximately 120 µs. Between two successive data packets, it is necessary to wait for a time for the interframe gap corresponding to 12 bytes. The time for the interframe gap relates to a prescribed minimum interval of time between two data packets that are to be fed in at a node of the predetermined path. In this case, the interframe gap time corresponds to approximately 1 µs. The propagation speed of Ethernet packets via twisted copper lines is approximately 200,000 km/s. The resultant signal propagation time on a link with a maximum length of 100 m is therefore 500 ns.

In this example, three adjacent nodes of a communication path are considered. A left-hand node, in this case the destination node, is connected via a link to a middle node, in this case the intermediate node, which in turn has a direct link to a right-hand node, in this case the source node. It is assumed that the middle node (intermediate node) wishes to send a low-priority long data packet and the right-hand node wishes to send a high-priority short data packet to the left-hand node (destination node). Both nodes send the respective packet at the beginning of the time window to their respective left-hand adjacent node. At the middle node, the high-priority data packet arriving from the right-hand node would conventionally need to wait until the long low-priority data packet has been transmitted completely. On account of greatly different transmission periods of 120 µs in comparison with 6 µs, this would mean significant jitter for the high-priority data packet at the middle node. This effect would accordingly accumulate if there were further intermediate nodes between the left-hand and middle nodes. To overcome this problem, the invention involves the additional second high-priority data packet being fed in at the middle node with the destination of the left-hand node. This second high-priority data packet may be designed as a pure dummy data packet without meaningful packet content or can be produced by segmenting a large low-priority data packet. In the latter case, the segments are brought together again at the destination node or an intermediate node along the path.

In accordance with the invention, however, the middle and right-hand nodes send a high-priority data packet in the direction of the left-hand node (destination node) at the beginning of the time window. The low-priority long packet that exists at the middle node is buffer-stored on account of the lower priority. The interframe gap means that the middle node must wait 1 µs after the transmission of the high-priority packet before the second high-priority data packet can be sent. Within this waiting time the high-priority data packet has already been received completely from the adjacent right-hand node with the propagation delay of no more than 500 ns via the link. Therefore, the high-priority data packet received from the right-hand node is selected as the next data packet to be sent at the middle nodes and the low-priority data packet continues to be buffer-stored. As a result, in contrast to the conventional scenario, the high-priority data packet transmitted by the right-hand node does not experience any waiting time at the intermediate node but rather can be immediately forwarded by the intermediate node. Consequently, the end-to-end delays and the jitter are minimized.

In one embodiment, each of the intermediate nodes whose first buffer store is empty at the particular instant and whose second buffer store is filled with at least one low-priority data packet at the particular instant generates the second high-priority data packet and feeds it into the predetermined path in the direction of the destination node.

Advantageously, each intermediate node that does not buffer a high-priority data packet but buffers at least one low-priority data packet therefore feeds a second and hence additional high-priority data packet into the predetermined path. Consequently, the respective intermediate node does not transmit the buffered low-priority data packet when the source node sends a high-priority data packet. Therefore, low-priority data packets are buffer-stored and not sent, which means that they cannot block the high-priority data packet transmitted by the source node.

In a further embodiment, the length of the second high-priority data packet is set based on the length of the first high-priority data packet. By setting the length of the second high-priority data packet based on the length of the first high-priority data packet, the waiting time that is set at the respective intermediate node for the first high-priority data packet is advantageously set.

In a further embodiment, the length of the second high-priority data packet is set based on maximum length of the low-priority data packets. The maximum length of the low-priority data packets prescribes the maximum delay for the first high-priority data packets. Consequently, this maximum length of the low-priority data packets can advantageously be taken as a basis for setting the length of the second high-priority data packet.

In a further embodiment, the nodes of the communication network are synchronized via a time-division multiplexing method, where the particular instant used is the beginning of a particular time window of the time-division multiplexing method. The time-division multiplexing method stipulates the particular instant for sending the data packets.

In a further embodiment, the time-division multiplexing method provides first time windows for an isochronous realtime service, second time windows for a nonisochronous realtime service and third time windows for a nonrealtime service. In this case, the particular instant used is the beginning of the second time window or the beginning of the third time window. Hence, the present method can be used for the aforementioned realtime traffic (RT) and normal traffic (NRT).

In a further embodiment, the high-priority and low-priority data packets are forwarded on the predetermined path in the second time window and in the third time window on the basis of priorities associated with the data packets.

In a further embodiment, the communication network is an Ethernet network, particularly a PROFINET network.

In a further embodiment, the high-priority data packets have a first maximum data packet length and the low-priority data packets have a second maximum data packet length. In this case, the second maximum data packet length is greater than the first maximum data packet length.

In a further embodiment, the second high-priority data packet is generated by segmentation of a low-priority data packet stored in the second buffer store. This embodiment provides a simple way of generating the second high-priority data packet. In addition, this also transmits meaningful data as second high-priority data packets via the predetermined path. The segments are then reassembled at the destination node or an intermediate node that is superordinate to the destination node.

In a further embodiment, the second high-priority data packet is generated as a dummy data packet. The dummy data packet has no meaningful data in its useful data field, in particular. The use of dummy data packets as second high-priority data packets is a form that is very simple to implement.

In a further embodiment, if the propagation time for a data packet between two nodes of the predetermined path is shorter than a prescribed minimum interval of time between two data packets that are to be fed in at a node of the predetermined path, then a header of a data packet arriving and not yet completely received at the intermediate node is evaluated. In this case, the evaluated header is taken as a basis for a second high-priority data packet to be generated by the intermediate node and fed into the predetermined path. Alternatively, the arriving data packet is received completely and then fed by the intermediate node into the predetermined data path again.

In a further embodiment, if the propagation time for a data packet between two nodes, of the predetermined path is shorter than a prescribed minimum interval of time between two data packets that are to be fed in at a node of the predetermined path, then exclusively high-priority data packets are fed from the intermediate nodes into the predetermined path.

The last two embodiments above are particularly suited to communication networks with higher bit rates, e.g., for a gigabit Ethernet, because the latter may involve the interframe gap being shorter than the signal propagation time on the link.

It is also an object of the invention to provide a computer program product that prompts the performance of the method as explained above on a program-controlled device.

A computer program product, such as a computer program means, can be provided or delivered, for example, as a storage medium, such as a memory card, USB stick, CD-ROM, DVD, or else in the form of a downloadable file from a server in a network. This can be effected in a wireless communication network, for example, by transmitting an appropriate file with the computer program product or the computer program means.

It is also an object of the invention to provide a data storage medium having a stored computer program with commands that prompts the performance of the method as explained above on a program-controlled device.

In addition, it is an object of the invention to provide a communication network comprising synchronized nodes for transmitting data packets via a predetermined path in the communication network, where the synchronized nodes of the predetermined path comprise a source node, a destination node and at least one intermediate node, feed data packets into the predetermined path in synchronized form and each have a first buffer store for buffer-storing high-priority data packets and a second buffer store for buffer-storing low-priority data packets, and where each of the intermediate nodes whose first buffer store is empty at a particular instant at which the source node feeds a first high-priority data packet into the predetermined path in the direction of the destination node is set up to generate a second high-priority data packet and to feed it into the predetermined path in the direction of the destination node.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The properties, features and advantages of this invention that are described above and also the manner in which they are achieved will become clearer and more distinctly comprehensible in conjunction with the description below of the exemplary embodiments that are explained in more detail in conjunction with the drawings, in which.

DETAILED DESCRIPTION OF THE EXEMPLARY EMBODIMENTS

In the figures, elements that are the same or that have the same function have been provided with the same reference symbols unless stated otherwise.

Figure 1:
FIG. 1 shows a schematic diagram of a network topology for a communication network.
Figure 2:
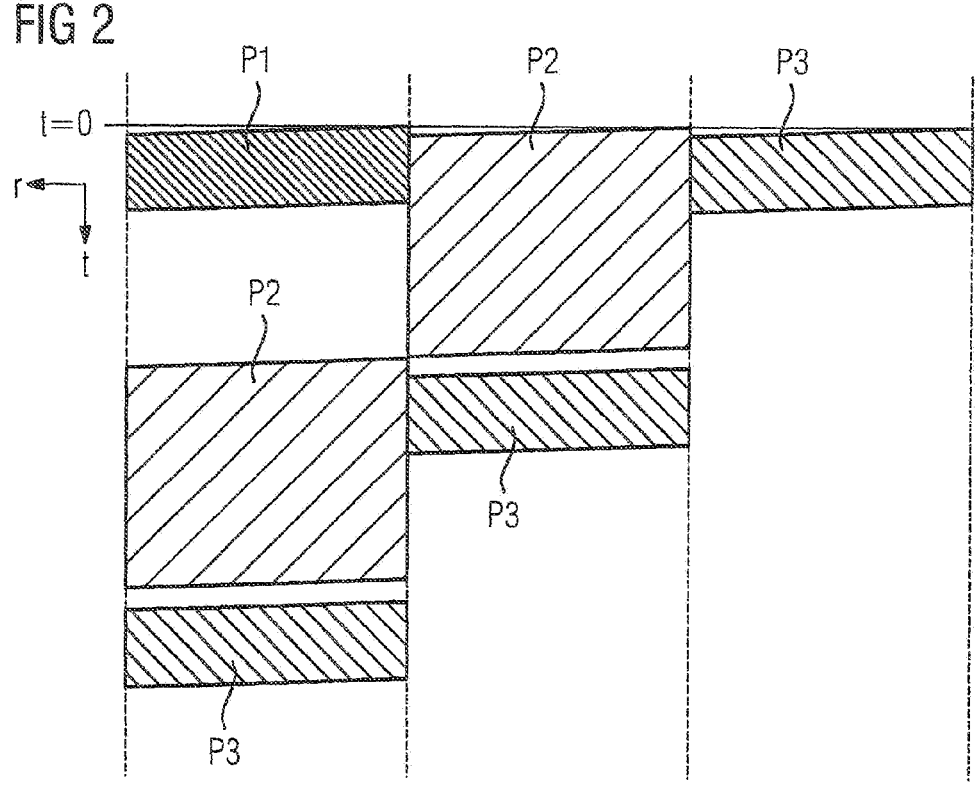
FIG. 2 shows a schematic diagram for the conventional transmission of data packets via the communication network of FIG. 1.
Figure 3:
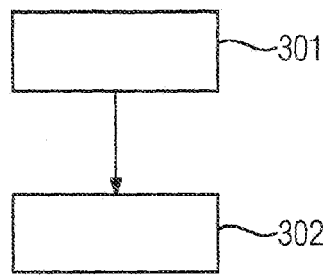
FIG. 3 shows a flowchart for an exemplary embodiment of a method for transmitting data packets in a communication network comprising synchronized nodes.
Figure 4:
FIG. 4 shows the schematic diagram of the network topology of the communication network of FIG. 1.
Figure 5:
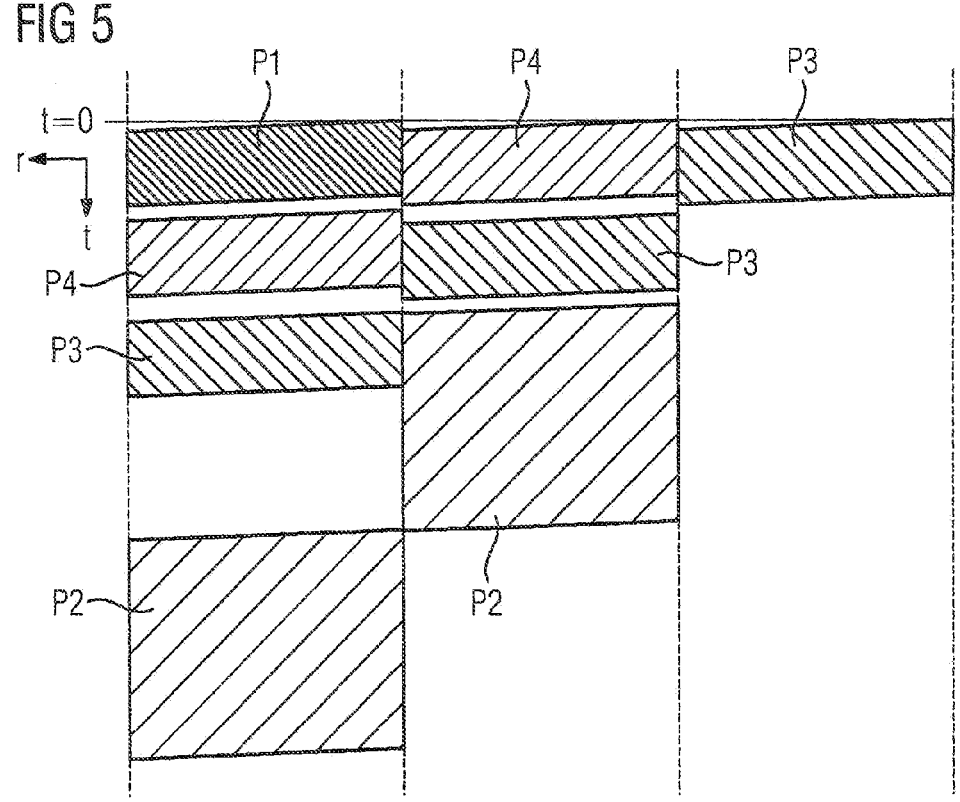
FIG. 5 shows a schematic diagram for the inventive transmission of data packets via the communication network of FIG. 3.

FIG. 3 shows a flowchart for an exemplary embodiment of a method for transmitting data packets P1-P4 in a communication network N comprising synchronized nodes A-D via a predetermined path P in the communication network N. In this regard, FIG. 4 shows a schematic diagram of the network topology of such a communication network N and FIG. 5 shows a schematic diagram for the transmission of the data packets P1-P4 via the communication network 1 in accordance with the invention. The synchronized nodes A, B, C, D of the predetermined path P comprise a source node D, a destination node A and two intermediate nodes B, C arranged in between them. The nodes A-D are set up to feed the data packets P1-P4 into the predetermined path P in synchronized form. The respective node A-D has a first buffer store for buffer-storing high-priority data packets P1, P3, P4 and a second buffer store for buffer-storing low-priority data packets P2 (not shown).

In step 301, the source node D feeds a high-priority data packet P3 into the predetermined path P in the direction of the destination node A. In step 302, each of the intermediate nodes B, C whose first buffer store is empty at the particular instant feeds a second high-priority data packet P4 into the predetermined path P in the direction of the destination node A. In the example in FIG. 5, this applies only to the intermediate node C, because the intermediate node B is itself already feeding in a first high-priority data packet P1. The nodes A, B, C, D are synchronized and feed synchronized data packets P1-P4 into the path P. As a result, steps 301, 302 are performed simultaneously, i.e., at the particular instant.

At this particular instant, each of the intermediate nodes C, in particular, feeds a second high-priority data packet P3 into the predetermined path P whose first buffer store is empty at the particular instant and whose second buffer store is filled with at least one low-priority data packet P2 at the particular instant. The length of the second high-priority data packet P4 is preferably set based on the length of the first high-priority data packet P3 and/or based on a maximum length of the low-priority data packets P2.

The nodes A, B, C, D are synchronized via a time-division multiplexing method, the particular instant used being the beginning of a particular time window of the time-division multiplexing method. By way of example, the time-division multiplexing method provides first time windows for an isochronous realtime service, second time windows for a nonisochronous realtime service and third time windows for a nonrealtime service. The particular instant used in each case can be the beginning of the second time window or the beginning of the third time window.

The high-priority and low-priority data packets P1, P2, P3, P4 are forwarded in the second time window and the third time window based on priorities associated with the data packets P1, P2, P3, P4 and based on static multiplexing on the predetermined path P. The respective second high-priority data packet P4, which can also be called an additional high-priority data packet, is generated by segmenting a low-priority data packet P2 stored in the second buffer store, for example. Alternatively, the second high-priority data packet P4 may also be designed as a dummy data packet without meaningful data in its useful data field.

If the propagation time for a data packet P1-P4 between two nodes A-D of the predetermined path P is shorter than a prescribed minimum interval of time between two data packets P1-P4 that are to be fed in at a node A-D of the predetermined path P, a header of a data packet P3 arriving and not yet completely received at the intermediate node C is evaluated. In addition, the evaluated header is taken as a basis for a second high-priority data packet P4 to be generated by the intermediate node C and fed into the predetermined path P. Alternatively, the arriving data packet P3 can be received completely and then fed into the predetermined path P again by the intermediate node C.

Alternatively, for the above case in which the propagation time for the data packet between two nodes of the predetermined path P is shorter than a prescribed minimum interval of time between two data packets P1-P4 that are to be fed in at the node of the predetermined path P, exclusively high-priority data packets can be fed into the predetermined path P from the intermediate node C.

As stated above, FIG. 4 shows the schematic diagram of the network topology of the communication network N for performing the method of FIG. 3. In this regard, FIG. 5 shows a schematic diagram for the inventive transmission of the data packets P1-P4 via the communication network N. Here, FIG. 5 visualizes the message flow of the packets. P1-P4. In this case, an additional high-priority packet P4, which has the destination node A as a destination, is fed in at the node C. The higher priority of the additional high-priority data packet P4 over the low-priority data packet P2 means that the data packet P4 is sent at the beginning of the cycle. Following the transmission of this high-priority data packet P4, the next data packet for transmission is selected after the interframe gap has elapsed. At this instant, both the low-priority data packet P2 and the high-priority data packet P3 that has already been received from the adjacent node D are available for selection. This is possible because in the case of 100 Mbit/s Ethernet the propagation delay of the signals on the link is shorter than the duration of the interframe gap. Therefore, the high-priority data packet P3 is then forwarded immediately by the node C and arrives at the destination node A with minimized end-to-end delay and jitter.

The approach described is not limited to PROFINET but can be applied to all other Ethernet solutions that define time cycles by synchronization of the nodes or stations and use prioritization of packets. A further example of this is Ethernet POWERLINK.

In addition, the approach described can also be applied to data packets in a plurality of priority classes, the low-priority data packets being associated with a lower or the lowest priority class and the high-priority data packets being associated with a high or the highest priority class.

Although the invention has been illustrated and described in more detail by the preferred exemplary embodiment, the invention is not limited by the disclosed examples and it is possible for other variations to be derived therefrom by a person skilled in the art without departing from the scope of protection of the invention.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for transmitting data packets in a communication network comprising synchronized nodes via a predetermined path in the communication network, wherein the synchronized nodes of the predetermined path comprise a source node, a destination node and at least one intermediate node, said synchronized nodes feeding synchronized data packets into the predetermined path and each having a first buffer store for buffer-storing high-priority data packets comprising control and regulatory data and a second buffer store for buffer-storing low-priority data packets, the method comprising:

generating, by the at least one intermediate nodes, a second high-priority data packet when said at least one intermediate nodes has an empty first buffer store at a particular instant at which the source node feeds a first high-priority data packet comprising control and regulatory data into the predetermined path toward the destination node; and feeding the generated second high-priority data packet into the predetermined path toward the destination node.

2. The method as claimed in claim 1, wherein the at least one intermediate node having the empty first buffer store, at the particular instant and having a second buffer store filled with at least one low-priority data packet comprising control and regulatory data at the particular instant, generates the second high-priority data packet and feeds the generated second high-priority data packet into the predetermined path toward the destination node.

3. The method as claimed in claim 2, wherein a length of the second high-priority data packet is set based on a length of the first high-priority data packet comprising control and regulatory data.

4. The method as claimed in claim 2, wherein a length of the second high-priority data packet is set based on a maximum length of the low-priority data packets.

5. The method as claimed in claim 1, wherein a length of the second high-priority data packet is set based on a length of the first high-priority data packet comprising control and regulatory data.

6. The method as claimed in claim 5, wherein the length of the second high-priority data packet is set based on a maximum length of the low-priority data packets.

7. The method as claimed in claim 1, wherein a length of the second high-priority data packet is set based on a maximum length of the low-priority data packets.

8. The method as claimed in claim 1, wherein the synchronized nodes of the communication network are synchronized via a time-division multiplexing method, and wherein the particular instant utilized is a beginning of a particular time window of the time-division multiplexing method.

9. The method as claimed in claim 8, wherein the time-division multiplexing method provides first time windows for an isochronous realtime service, second time windows for a nonisochronous realtime service and third time windows for a nonrealtime service, and wherein the particular instant utilized is a beginning of the second time window or a beginning of the third time window.

10. The method as claimed in claim 9, wherein the high-priority comprising control and regulatory data and low-priority data packets are forwarded in the second time window and in the third time window based on priorities associated with the high-priority comprising control and regulatory data and low-priority data packets.

11. The method as claimed in claim 1, wherein the communication network comprises an Ethernet network.

12. The method as claimed in claim 11, wherein the Ethernet network comprises a PROFINET network.

13. The method as claimed in claim 1, wherein the high-priority data packets comprising control and regulatory data have a first maximum data packet length and the low-priority data packets have a second maximum data packet length which is greater than the first maximum data packet length.

14. The method as claimed in claim 1, wherein the second high-priority data packet is generated by segmentation of a low-priority data packet stored in the second buffer store.

15. The method as claimed in claim 1, wherein the second high-priority data packet is generated as a dummy data packet, particularly without useful data.

16. The method as claimed in claim 1, wherein the dummy data packet is devoid of useful data.

17. The method as claimed in claim 1, wherein if a propagation time for a data packet between two nodes of the synchronized nodes of the predetermined path is shorter than a prescribed minimum interval of time between two data packets of the synchronized data packets that are to be fed in at a node of the predetermined path, then a header of a data packet arriving and not yet completely received at the intermediate node is evaluated, and wherein the evaluated header is taken as a basis for one of (i) the second high-priority data packet to be generated by the intermediate node and fed into the predetermined path and (ii) an arriving data packet to be received completely and then re-fed by the intermediate node into the predetermined data path.

18. The method as claimed in claim 1, wherein if a propagation time for a data packet between two nodes of the synchronized nodes of the predetermined path is shorter than a prescribed minimum interval of time between two data packets of the synchronized data packets that are to be fed in at a node of the predetermined path, then exclusively high-priority data packets comprising control and regulatory data are fed from the intermediate nodes into the predetermined path.

19. A non-transitory computer program product encoded with a computer program, which when executed on a program-controlled device, causes performance of a method comprising:
   generating, by at least one intermediate nodes, a second high-priority data packet when said at least one intermediate nodes has an empty first buffer store at a particular instant at which a source node feeds a first high-priority data packet comprising control and regulatory data into a predetermined path toward a destination node; and
   feeding the generated second high-priority data packet into the predetermined path toward the destination node.

20. A communication network comprising:
   synchronized nodes for transmitting data packets via a predetermined path in the communication network;
   wherein the synchronized nodes of the predetermined path comprise a source node, a destination node and at least one intermediate node, feed data packets into the predetermined path in synchronized form and each of the synchronized nodes include a first buffer store for buffer-storing high-priority data packets comprising control and regulatory data and a second buffer store for buffer-storing low-priority data packets; and
   wherein each of the intermediate nodes having an empty first buffer store at a particular instant at which the source node feeds a first high-priority data packet comprising control and regulatory data into the predetermined path in the direction of the destination node is configured to generate a second high-priority data packet and to feed the generated second high-priority data packet into the predetermined path toward the destination node.

* * * * *